July 19, 1955
W. S. TSUCHIYA
2,713,297
TRACTOR-MOUNTED OFFSET DISK HARROW
Filed Jan. 5, 1950
4 Sheets-Sheet 2
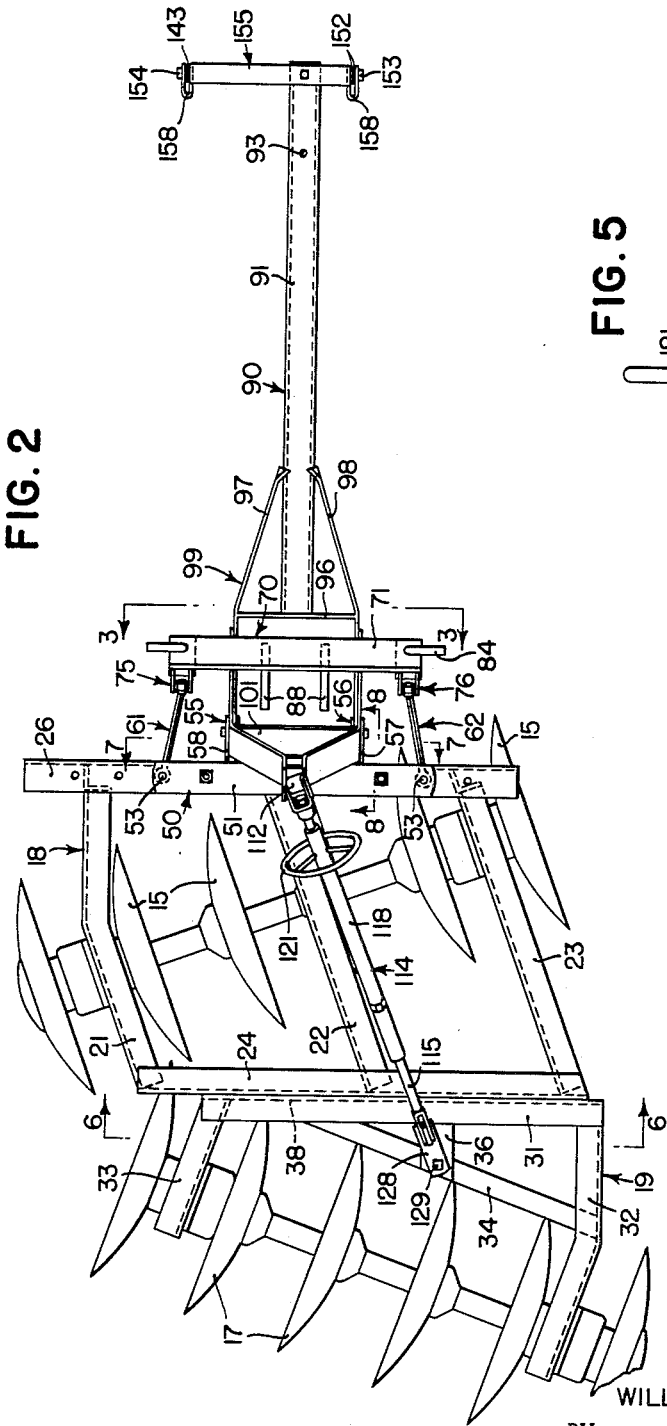
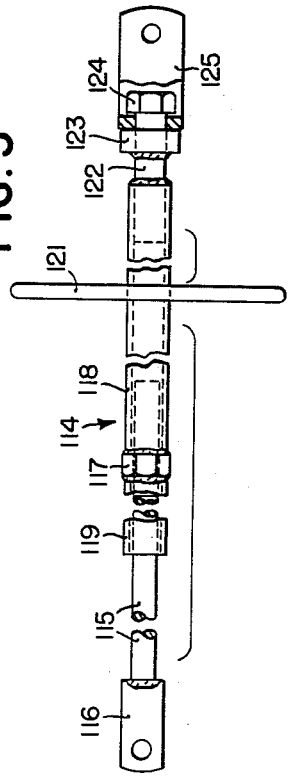
INVENTOR.
WILLIAM S. TSUCHIYA
BY
ATTORNEYS July 19, 1955  W. S. TSUCHIYA  2,713,297
TRACTOR-MOUNTED OFFSET DISK HARROW
Filed Jan. 5, 1950  4 Sheets-Sheet 3
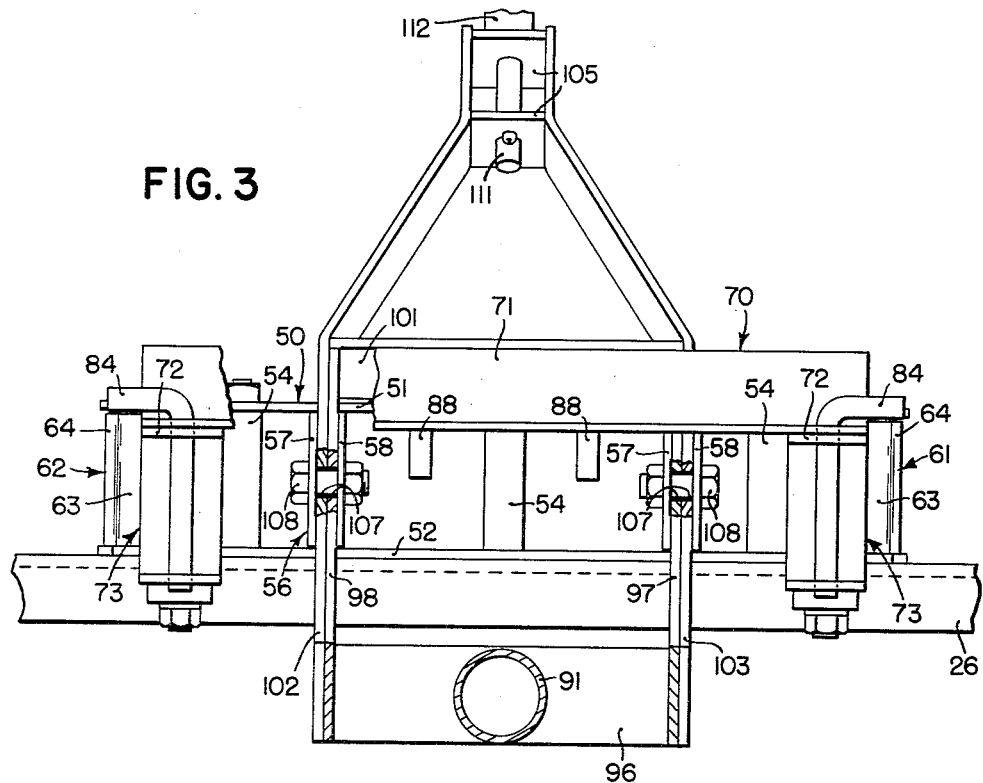
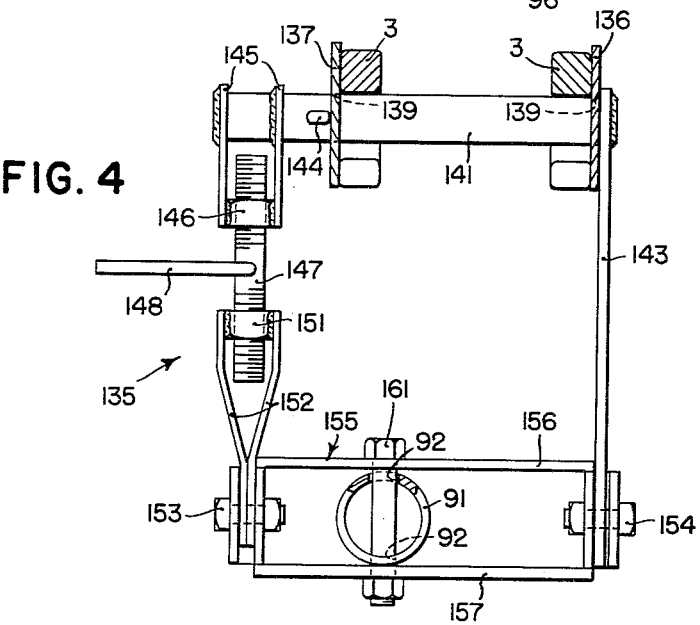
INVENTOR.
WILLIAM S. TSUCHIYA
BY
ATTORNEYS

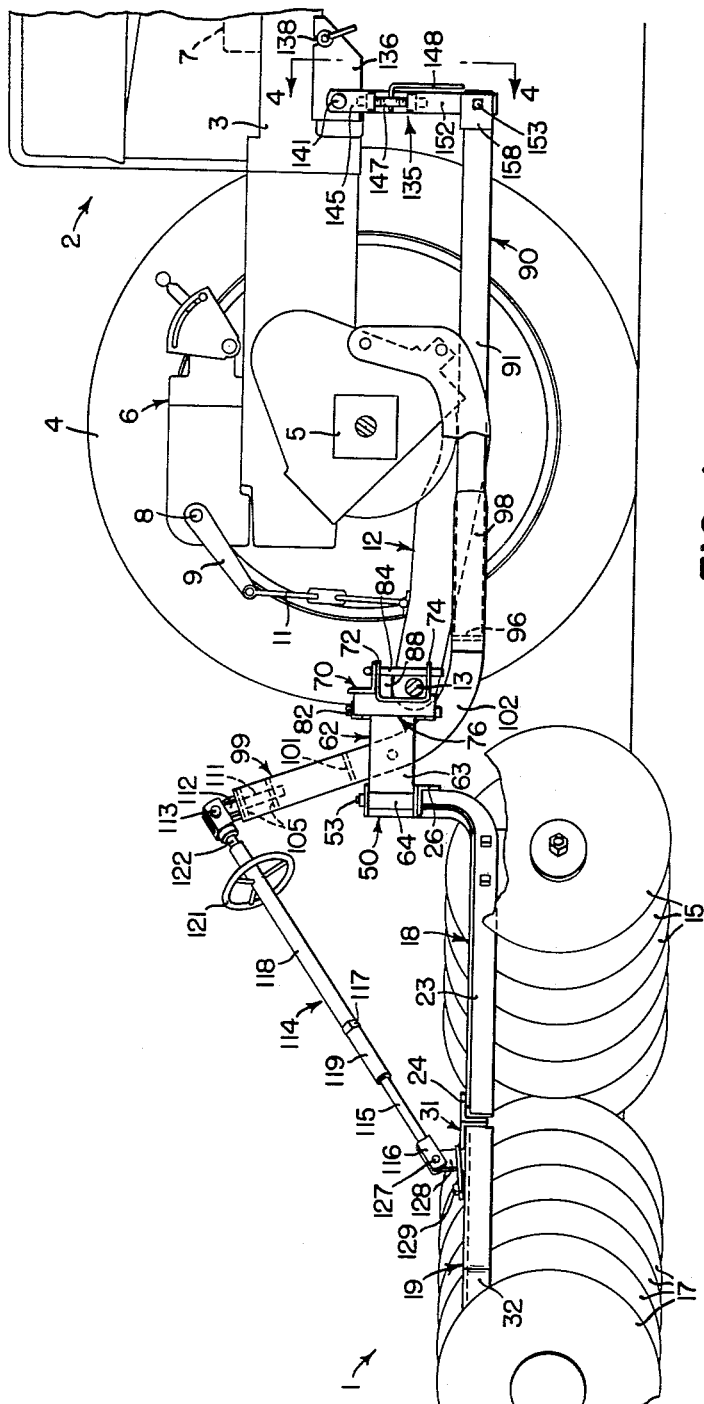
FIG. I
INVENTOR.
WILLIAM S. TSUCHIYA

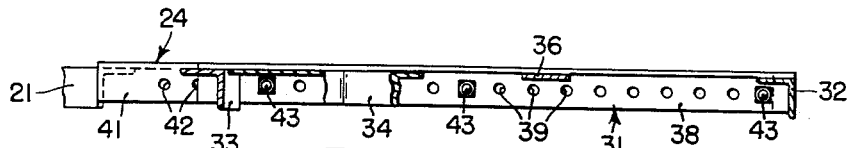
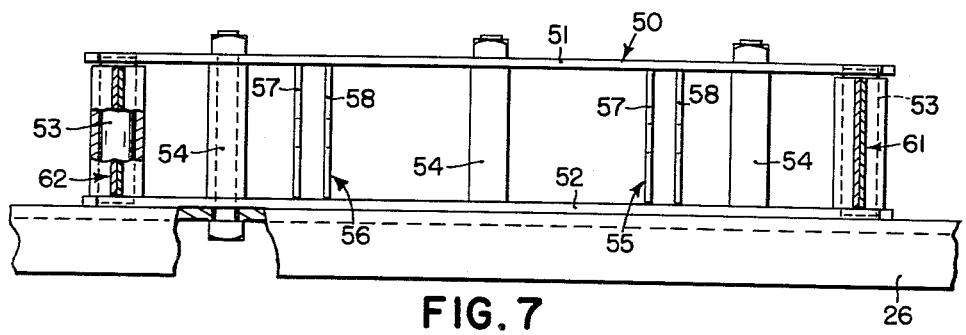
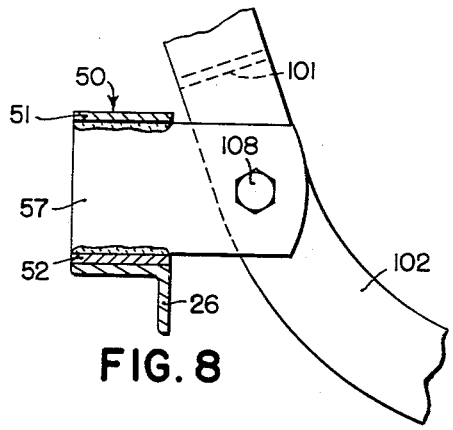
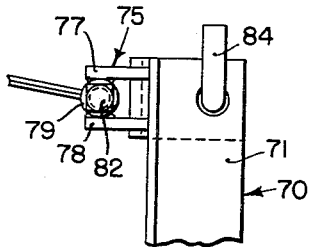
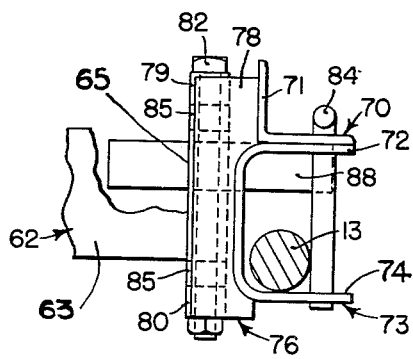
INVENTOR.
WILLIAM S. TSUCHIYA

United States Patent Office 2,713,297
Patented July 19, 1955

2,713,297

TRACTOR-MOUNTED OFFSET DISK HARROW

William S. Tsuchiya, Los Angeles, Calif., assignor to John Deere Killefer Company, Los Angeles, Calif., a corporation of California Application January 5, 1950, Serial No. 136,871

12 Claims. (Cl. 97—47.51)

The present invention relates generally to agricultural machines and more particularly to integral implements, that is, implements adapted to be supported entirely on the tractor that propels the machine.

The object and general nature of this invention is the provision of a tractor-carried implement, such as a disk harrow, in which the implement is adapted to be connected to the drawbar of the tractor, preferably by quick-attachable means, and in which the drawbar serves to transmit the propelling draft to the implement. Further, it is a feature of this invention to provide means including a torque tube adjustably connected with the implement and extending forwardly of the drawbar and connected with the tractor so as to react against the latter for maintaining the implement in a laterally level position but at the same time accommodating a generally lateral shifting of the implement about a forwardly disposed virtual hitch point whereby turning of the outfit in one direction or the other is accommodated with relative freedom of movement.

These and other objects and advantages of the present invention will be apparent to those skilled in the art after a consideration of the following detailed description taken in conjunction with the accompanying drawings in which the preferred form of the invention has been illustrated.

In the drawings:

Figure 1 is a side view of a disk harrow in which the principles of the present invention have been incorporated.

Figure 2 is a top view of the harrow shown in Figure 1.

Figure 3 is an enlarged fragmentary view taken generally along the line 3—3 of Figure 2 and looking rearwardly.

Figure 4 is an enlarged sectional view taken generally along the line 4—4 of Figure 1 and also looking rearwardly.

Figure 5 is an enlarged detail view of the depth control adjusting mechanism.

Figure 6 is a detail section, taken along the line 6—6 of Figure 2, showing the frame adjustment means.

Figure 7 is a sectional view taken generally along the line 7—7 of Figure 2, and Figure 8 is a sectional view taken along the line 8—8 of Figure 2.

Figure 9 and 10 are fragmentary detail views of certain portions of the drawbar lift frame.

The present invention has been illustrated as incorporated in an integral or tractor-mounted offset disk harrow 1 constructed and arranged to be carried by a tractor 2 which is of conventional construction so far as the principles of the present invention are concerned, the tractor 2 including a frame 3 supported on tractor steerable wheels (not shown) and rear drive wheels 4 fixed to axle shafts carried by a rear axle structure 5. The tractor 2 also includes a power lift unit 6 which derives its operating energy from the motor 7 of the tractor and which includes a transverse rockshaft 8 carrying arms 9 which are connected by links 11 to a rear portion of the drawbar 12 of the tractor. The drawbar 12 of the tractor includes a transverse shaft section 13 which is adapted to receive any one or more of a variety of implements, such as the disk harrow 1 mentioned above.

The disk harrow 1 with which the present invention is more particularly concerned, includes a front gang of disks 15 and a rear gang of disks 17 mounted, respectively, for rotation in front and rear gang frames 18 and 19, the frames, taken together, constituting an implement frame means, the latter being constructed so that the front and rear gangs 15 and 17 are disposed at an angle to one another so as to secure the proper penetration and operation of the implement. The front frame 18 comprises three generally fore and aft extending angle members 21, 22 and 23 arranged generally perpendicularly with respect to the axis of rotation of the tractor gang 15 and connected together at their rear ends by a rear crossbar 24 to which the rear ends of the frame bars 21, 22 and 23 are welded. The front portions of the gang frame bars 21, 22 and 23 are turned upwardly, as best shown in Figure 1, and the front portion of the left-hand frame bar 21 is bent laterally inwardly and then upwardly so as to terminate in the same horizontal plane as the upper ends of the upturned portions of the frame bars 22 and 23. A front crossbar 26 is welded to the upturned forward ends of the gang frame bars 21, 22 and 23, thereby forming a sturdy rigid construction. The front gang 15 is connected with the frame 18 by suitable brackets and bearings, the details of which do not per se form a part of the present invention.

The rear gang frame 19 is of similar construction and incorporates a front crossbar 31 and right- and left-hand side bars 32 and 33. The right-hand side bar 32 is bent intermediate its ends and is secured, as by welding, at its forward end to the right-hand end portion of the front frame member 31. The right-hand side bar 32 is also connected to the front frame member 31 by a cross brace 34 which is welded to the middle portion of the side bar 32 and to the left-hand portion of the front bar 31. The cross brace 34 is reenforced by a plate 36 which is welded to the middle portions of the frame members 31 and 34, as best shown in Figure 2. The forward end of the left-hand side frame member 33 is secured, as by welding, to the left end of the front bar 31 and to the adjacent portions of the cross brace 34. The forward vertical flange 38 of the frame member 31 is provided with a plurality of apertures 39, and, similarly, the vertical flange 41 of the rear frame angle 24 is provided with a corresponding series of apertures 42. A plurality of bolts 43 are extended through the selected openings 39 and 42 and when tightened rigidly secure the rear frame 19 to the front frame 18, but the lateral position of one with respect to the other may be varied, as desired, by removing the bolts 43, shifting the frames, placing the bolts 43 in other openings in the flanges 38 and 41, and then retightening the bolts.

A carrier frame 50 is connected rigidly but adjustably to the front angle 26 of the front frame 18. The carrier frame 50 comprises upper and lower strap members 51 and 52 which at their ends are welded to vertical swivel pins 53. The swivel pins 53 serve as spacers for holding the strap members 51 and 52 in spaced-apart relation, acting in conjunction with intermediate spacer bushings 54 bolted to the bars 51 and 52 and brackets 55 and 56, each of which comprises a pair of plates 57 and 58 disposed in spaced-apart relation and welded along their upper and lower edges to the upper and lower strap members 51 and 52. The brackets 55 and 56 extend forwardly beyond the front edges of the carrier frame members 51 and 52 and the forward end portions of the bracket plates 57 and 58 are apertured to receive pivot means whereby the carrier frame 50 may be connected to a torque control unit to which more detailed reference will be made below. A pair of sway links 61 and 62 are connected at their rear ends to the swivel pins 53, each sway link comprising a plate member 63, a rear sleeve section 64 receiving the associated swivel pin 53, and a front sleeve section 65, the sleeve sections 64 and 65 being secured as by welding to the front and rear ends of the plates 63.

A drawbar lift frame 70 is connected to the forward ends of the generally vertically disposed and laterally swingable sway links 63. The drawbar lift frame 70 is made up of a transversely disposed angle member 71 welded at its ends to the upper legs 72 of a pair of yokes 73, the yokes 73 having lower legs 74 and being generally U-shaped and disposed in a vertical position, one at each end of the angle 71. Pivot brackets 75 and 76 are secured to the rear portions of the angle 71 and yokes 73, and each of the brackets 75 and 76 comprises a pair of bracket plates 77 and 78 welded to the back side of the angle 71 and the central portions of the yokes 73 and arranged in laterally spaced-apart relation, receiving therebetween upper and lower bearing sleeves 79 and 80. The bearing sleeves 79 and 80 are disposed in vertical alignment and receive a pivot pin 82 which, in turn, receives the sleeve 65 of the associated sway link 63. The upper and lower legs of the drawbar-receiving yokes 73, together with the associated portions of the horizontal flange of the angle 71, are apertured to receive quick-detachable drawbar pins 84 which serve the purpose of holding the drawbar lift frame 70 on the central section 13 of the tractor drawbar 12. Further, the length of the angle 71 and the positions of the drawbar-receiving yokes 73 are such that the lift frame 70 fits snugly between the side members of the tractor drawbar 12 whereby lateral displacement of the drawbar lift frame 70 relative to the drawbar 12 is prevented. The drawbar pins 84 are disposed on the forward side of the transverse drawbar section 13 whereby the implement is connected to the tractor drawbar 12 in draft-transmitting relation. However, the implement is readily detached from the tractor by removing the pins 84. Spacer bushings 85 are disposed about the swivel pins 82, between the bearing sleeves 79 and 80 and the upper and lower ends of the associated sway link sleeves 65. A pair of raising blocks 88 are fixed, as by welding, to the central portion of the frame angle 71 in laterally spaced-apart relation, and the ends of the raising blocks extend forwardly to a position overlying the transverse drawbar member 13 whereby, when the drawbar is swung upwardly the drawbar member 13 engages the lifting blocks 88 and thus raises the drawbar lift frame 70 which, acting through the sway links 61 and 62, also raises the implement.

The carrier frame 50 and the drawbar lift frame 70, taken together, constitute the principal portions of a hitch means that connects the implement with the tractor drawbar, and a torque control device, which serves to maintain the implement in a laterally level position in operation, is indicated in its entirety by the reference numeral 90 and comprises a generally fore and aft extending torque tube 91 provided with a pair of apertures 92 at its forward end and a second pair of apertures 93 rearwardly of the apertures 92. The rear end of the torque tube 91 is welded to the central portion of a crossbar 96 and forwardly thereof the torque tube is welded to the forward, laterally inwardly disposed ends of a pair of curved side bars 97 and 98. The bars 96, 97 and 98 form a part of a torque control frame 99 which also includes an upper crossbar 101 welded to the upper ends of the rear upturned portions of the side bars 97 and 98, and a pair of rear, generally upwardly extending side bars 102 and 103 which, as best shown in Figure 3, converge upwardly and at their upper ends are welded to a pair of vertically spaced-apart swivel bearing blocks 105. The side members 97, 98 and 102, 103 are apertured, as at 107, to receive pivot members 108 which pass through the apertures 107 in the torque tube frame and the apertures in the forward portions of the bracket plates 57 and 58 of the carrier frame 50, the side portions of the torque tube frame being so constructed and arranged as to fit snugly between the plates 57 and 58 of the torque frame receiving brackets 55 and 56.

A pin 111 is swivelly disposed in the bearing plates 105 and at its upper end carries an eye section 112 which receives a cross bolt 113 that connects a depth control linkage 114 therewith. The depth control linkage 114, which constitutes adjustable strut means connected between the gang frame means and the torque tube unit 90, comprises a lower rod member 115 carrying a yoke 116 at its lower end and threaded at its upper end into a nut member 117 to which upper and lower pipe sections 118 and 119 are welded. The lower pipe section 119 protects the threaded portion of the rod member 113 and the upper pipe section 118, which is longer than the lower section 119, receives a hand wheel 121 and is welded to the end of a bearing stud 122 to which a thrust washer 123 is fixed, as by welding, a short distance from the head 124 of the stud 122. A U-shaped screw-adjustment yoke 125 has its central portion apertured and disposed about the outer end of the bearing stud 122 between the thrust portion 123 and the head 124. The side portions of the screw-adjustment yoke 125 are apertured to receive the pivot bolt 113 by which the unit 114 is connected to the swivel pin 111. The lower yoke 116 is connected by a pivot bolt 127 to a bracket 128 that is fixed to the front angle of the rear gang frame 19 by means of a bolt 129 or other suitable means. By manipulating the hand wheel 121 the screw-adjustment device, acting between the interconnected frames of the disk gangs and the upper end of the torque control device, may be adjusted to level the disk gangs in a fore and aft direction.

The front end of the torque control device 90 is connected with the tractor 1 by means of a depth control and torque-transmitting unit 135, best shown in Figure 4. The unit 135 includes a pair of attachment plates 136 and 137 which are slotted, as at 138, to facilitate attachment to the tractor by any suitable means. The attachment plates 136 and 137 are apertured, as at 139, to receive a leveling control shaft 141 that is rockable in the attachment plates 136 and 137. Secured to one end of the shaft 141 is an arm 143 which is disposed on the outer side of the associated attachment plate 136, and a lug 144 on the outer side of the attachment plate 137 is fixed to the shaft 141 so that by virtue of the arm 143 and the lug 144 the shaft 141 is held against lateral displacement in its bearing support in the openings 139. At the end of the shaft 141 opposite the arm 143 is a pair of relatively short arms 145 that are fixed to the shaft, as by welding, in laterally spaced relation, and a nut member 146 is welded to the outer ends of the short arms 145. A leveling screw 147, apertured to receive a handle member 148, is threaded at one end into the nut member 146 and at its other end is threaded into a nut member 151 which is welded to a pair of straps 152 which form a lower leveling member. The latter is connected at its lower end by a pivot bolt 153 to a crossbar structure 155 and the lower end of the arm 143 is connected to the crossbar structure 155 by a pivot bolt 154. The crossbar structure 155 comprises upper and lower bars 156 and 157 connected together at their ends by a pair of yoke members 158 which are generally U-shaped in configuration and apertured to receive the lower end of the arm 143 and the lower end of the lower leveling link member 152. The middle portions of the upper and lower strap members 156 and 157 are apertured to receive a pivot bolt 161 that connects the front end of the torque tube 91 to the front leveling unit 135. The bolt 161 may be disposed in either the front or rear pair of openings 92 and 93, as desired. By virtue of the connection of the front end of the torque tube to the unit 135 and by the latter to the tractor, the torque control device 90 serves to hold the disk gangs in a laterally level position, which may be varied or changed, as desired, by turning the adjusting screw 147 in one direction or the other by the handle member 148.

In operation, raising or lowering the tractor drawbar 12 acts through the drawbar-receiving frame 70 and the carrier frame 50 to increase or decrease the depth of operation, the connection of the front end of the torque tube with the tractor through the unit 135 serving to maintain the desired depth of operation. The gangs are leveled fore and aft by turning the screw adjustment 114 in one direction or the other, and the gangs are leveled in a lateral direction by turning the leveling adjustment screw 147. The rear ends of the raising blocks 88 serve as stops for limiting the lateral swinging of the sway links 61 and 62.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A disk harrow adapted to be attached to a tractor having a vertically swingable drawbar raised and lowered to control implements and the like, said disk harrow comprising a drawbar-receiving frame, a disk gang frame, means connecting said disk gang frame to said drawbar-receiving frame for free lateral movement relative thereto, a torque control unit pivotally connected at its rear portion with one of said frames for movement about a transverse axis, means acting between the rear portion of said torque control unit and the rear portion of said disk gang frame for adjusting the latter relative to said torque control unit about said transverse axis, and means for connecting the forward end of said torque control unit with the tractor in torque-transmitting relation and accommodating said relatively free lateral movement of said gang frame relative to said drawbar-receiving frame.

2. A disk harrow adapted to be attached to a tractor having a vertically swingable drawbar raised and lowered to control implements and the like, said disk harrow comprising a drawbar-receiving frame, a disk gang frame, means connecting said disk gang frame to said drawbar-receiving frame for free lateral movement relative thereto, a torque control unit pivotally connected adjacent its rear portion with one of said frames for movement about a transverse axis, means acting between said torque control unit and said disk gang frame for adjusting the latter relative to said torque control unit about said transverse axis, and means for connecting the forward end of said torque control unit with the tractor in torque-transmitting relation and accommodating said relatively free lateral movement of said gang frame relative to said drawbar-receiving frame.

3. A disk harrow adapted to be attached to a tractor, said disk harrow comprising a drawbar-receiving frame, a disk gang frame, means including a pair of forwardly converging links pivoted to said frames for swinging movement about vertical axes for connecting said disk gang frame to said drawbar-receiving frame for free lateral movement relative thereto, a torque control unit pivotally connected at its rear portion with one of said frames for movement about a transverse axis, and means for connecting the forward end of said torque control unit with the tractor in torque-transmitting relation and accommodating said relatively free lateral movement of said gang frame relative to said drawbar-receiving frame.

4. A disk harrow adapted to be connected with a tractor having drawbar means adapted to be raised and lowered by power, said disk harrow comprising a pair of gang frames interconnected to form a harrow frame means and carrying fore and aft spaced disk gangs, means for detachably connecting said frame to the tractor drawbar means, a rigid member pivotally connected at its rear end with said harrow frame, adjustable means for connecting the forward end portion of said rigid member with the tractor, said means including adjustable parts adapted to act between the tractor and said rigid member for shifting the latter, relative to the tractor, about a generally fore-and-aft extending axis for leveling the disk harrow laterally, and generally fore and aft adjustable means including telescopically adjustable rigid links connecting the rear portion of said harrow frame with the rear end of said rigid member and acting between the latter and said harrow frame for leveling the latter in a fore and aft direction.

5. A disk harrow adapted to be connected with a tractor having drawbar means adapted to be raised and lowered by power, said disk harrow comprising a pair of gang frames interconnected to form a harrow frame and carrying fore and aft spaced disk gangs, means for detachably connecting said frame to the tractor drawbar means and accommodating swinging of the harrow frame relative to the drawbar means about a transverse axis, a rigid member pivotally connected at its rear end with said harrow frame and also accommodating swinging of the harrow frame relative to the rigid member about a transverse axis, means for connecting the forward end of said rigid member with the tractor so as to resist movement of said rigid member relative to the tractor about a fore and aft extending axis, and generally fore and aft adjustable means connecting the rear portion of said harrow frame with the rear end of said rigid member and acting between the latter and said harrow frame for leveling the latter in a fore and aft direction.

6. A disk harrow adapted to be connected with a tractor having a power operated lifting drawbar, said harrow comprising a harrow frame, a rigid structure hingedly connected at its rear end with said frame for movement relative thereto about a transverse axis, hitch means for detachably connecting said harrow frame with said drawbar to receive lifting and propelling forces therefrom, said hitch means including a drawbar-receiving frame having forwardly facing socket means adapted to receive said drawbar with limited vertical lost motion, adjustable means acting between the rear end of said rigid structure and the rear portion of the harrow frame for leveling the latter in a fore and aft direction, and means acting between the tractor and said rigid structure for shifting the latter about a generally fore and aft extending axis for leveling the harrow frame in a lateral direction within the limits of said vertical lost motion.

7. A disk harrow adapted to be connected with a tractor having a power operated lifting drawbar, said harrow comprising a harrow frame, a rigid structure hingedly connected at its rear end with said frame for movement relative thereto about a transverse axis, hitch means for detachably connecting said harrow frame with said drawbar for lateral movement relative thereto while receiving lifting and propelling forces therefrom, said hitch means including a drawbar-receiving frame having forwardly facing socket means adapted to receive said drawbar with limited vertical lost motion, adjustable means acting between the rear end of said rigid structure and the rear portion of the harrow frame for leveling the latter in a fore and aft direction, means for connecting the forward end of said rigid structure with the tractor for lateral swinging relative thereto so as to accommodate the aforesaid lateral movement of the harrow frame relative to said drawbar, and means carried by said connecting means and acting between the tractor and said rigid structure for shifting the latter about a generally fore and aft extending axis for leveling the harrow frame in a lateral direction within the limits of said vertical lost motion.

8. A disk harrow adapted to be attached to a tractor having a vertically swingable drawbar raised and lowered to control implements and the like, said disk harrow comprising a harrow frame, a drawbar-receiving frame adapted to be pivotally connected with said tractor drawbar and accommodating vertical swinging of the harrow frame relative to the tractor drawbar, laterally swingable links connecting said frames to provide for the harrow frame shifting laterally relative to the tractor drawbar, and a torque control bar hingedly connected with the harrow frame and adapted to be connected with the tractor for lateral swinging relative thereto but held against movement relative to the tractor about a longitudinal axis.

9. A disk harrow adapted to be attached to a tractor having a vertically swingable drawbar raised and lowered to control implements and the like, said disk harrow comprising a pair of gang frames interconnected to form a harrow frame and carrying fore and aft spaced disk gangs and means connecting the rear gang frame with the front gang for lateral adjustment relative to the front gang frame, a drawbar-receiving frame adapted to be pivotally connected with said tractor drawbar and accommodating vertical swinging of the harrow frame relative to the tractor drawbar, means for connecting said harrow frame and said drawbar-receiving frame, a torque control bar having a horizontal portion adapted to extend forwardly under the tractor and an upturned portion at the rear end of said horizontal portion, means for hingedly connecting the torque control bar at laterally spaced points adjacent the juncture between said horizontal and upturned portions with said harrow frame, an adjustable connection connected for both vertical and lateral swinging with said upturned portion and the rear gang frame for leveling the harrow in a fore and aft direction, and torque-resisting means for connecting the front end of said torque control bar with the tractor.

10. A disk harrow adapted to be attached to a tractor having a vertically swingable drawbar raised and lowered to control implements and the like, said disk harrow comprising a drawbar-receiving frame, a disk gang frame, means connecting said disk gang frame to said drawbar-receiving frame for free lateral movement relative thereto, a torque control unit pivotally connected at its rear portion with said disk gang frame for movement about a transverse axis, means acting between the rear portion of said torque control unit and the rear portion of said disk gang frame for adjusting the latter relative to said torque control unit about said transverse axis, and means for connecting the forward end of said torque control unit with the tractor in torque-transmitting relation and accommodating said relatively free lateral movement of said gang frame relative to said drawbar-receiving frame.

11. A disk harrow adapted to be attached to a tractor, said disk harrow comprising a drawbar-receiving frame, a disk gang frame, means including a pair of forwardly converging links pivoted to said frames for swinging movement about vertical axes for connecting said disk gang frame to said drawbar-receiving frame for free lateral movement relative thereto, a torque control unit pivotally connected at its rear portion with said disk gang frame for movement about a transverse axis, and means for connecting the forward end of said torque control unit with the tractor in torque-transmitting relation and accommodating said relatively free lateral movement of said gang frame relative to said drawbar-receiving frame.

12. A disk harrow adapted to be connected with a tractor having drawbar means adapted to be raised and lowered by power, said disk harrow comprising a pair of gang frames interconnected to form a harrow frame and carrying fore and aft spaced disk gangs, means for detachably connecting said frame to the tractor drawbar means and accommodating swinging of the harrow frame relative to the drawbar means about a transverse axis, a rigid member pivotally connected at its rear end with said harrow frame and also accommodating swinging of the harrow frame relative to the rigid member about a transverse axis, means for connecting the forward end of said rigid member with the tractor so as to resist movement of said rigid member relative to the tractor about a fore and aft extending axis, and strut means connecting the rear portion of said harrow frame with the rear end of said rigid member and acting between the latter and said harrow frame for holding the harrow in a substantially level position.

References Cited in the file of this patent
UNITED STATES PATENTS

| | | |
|---|---|---|
| 1,688,615 | Daniel | Oct. 23, 1928 |
| 2,306,814 | Knapp | Dec. 29, 1942 |
| 2,440,550 | Martin | Apr. 27, 1948 |
| 2,456,693 | Fraga | Dec. 21, 1948 |
| 2,462,641 | Hyland | Feb. 22, 1949 |